Sept. 18, 1962 G. GARNIER 3,054,306
HOUSING FOR MECHANICAL RELAY, MORE PARTICULARLY FOR
DRIVING ACCESSORIES IN AIRCRAFT
Filed May 6, 1958
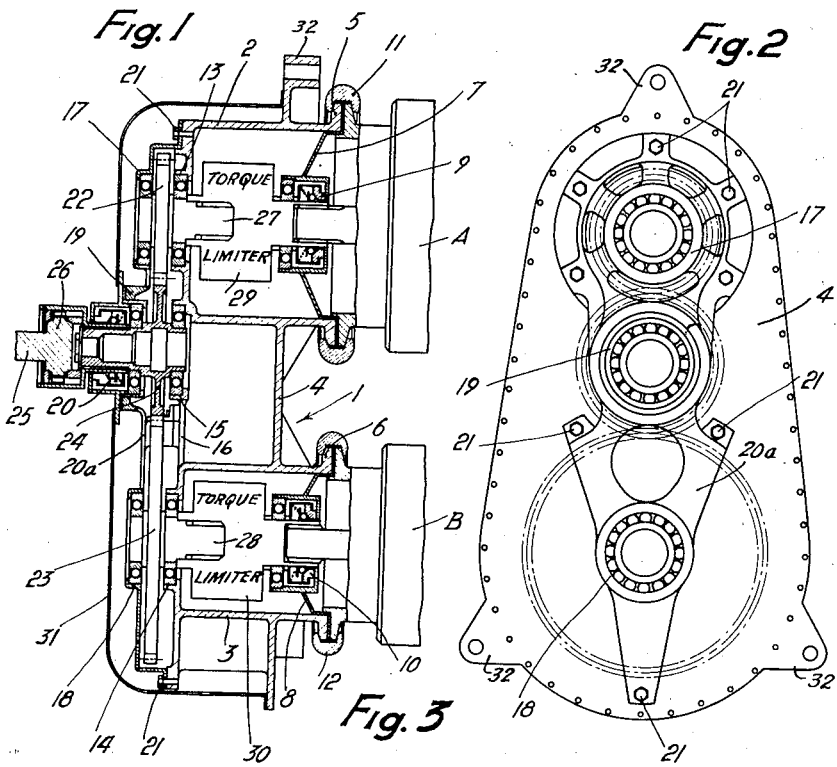
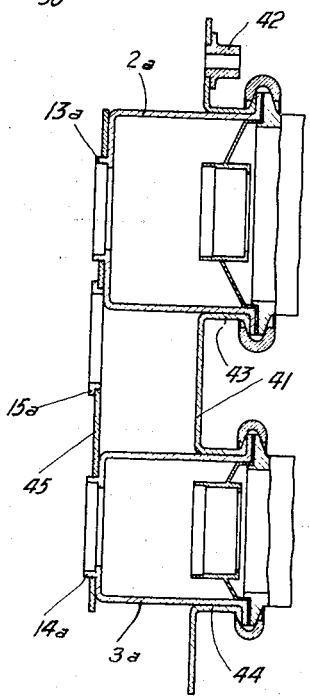
Inventor
GEORGES GARNIER
By C. J. Leek
ATTORNEY

United States Patent Office 3,054,306
Patented Sept. 18, 1962

3,054,306
HOUSING FOR MECHANICAL RELAY, MORE PARTICULARLY FOR DRIVING ACCESSORIES IN AIRCRAFT
Georges Garnier, Asnieres, France, assignor to Air-Equipment, Asnieres, France, a French company
Filed May 6, 1958, Ser. No. 733,369
Claims priority, application France May 17, 1957
7 Claims. (Cl. 74—606)

The present invention relates to mechanical gear boxes or relays and more particularly to the housing of relays used in aircraft for driving accessories (such as for example pumps, generators, or compressors).

In the interest of lightness, the housings which enclose the gears, the couplings, the torque limiters etc., of the accessory relays in aircraft and which must resist stresses, are generally composed of cast light metal.

Owing to the great differences between the expansion of the housings of magnesium or aluminium and the expansion of the moving steel parts enclosed in these housings, the clearances or play between the various elements could, under certain circumstances, become excessive and this constitutes a serious disadvantage.

This disadvantage is more serious in accessory relays used in aircraft flying at supersonic speeds, which relays must operate at rather high temperatures, the cooling air for the relay and the elements driven thereby being at temperatures of around 150 to 200° C.

The light metal housings having a high coefficient of expansion could be replaced by pressed or cast steel housings or titanium housings, but such units are heavy.

The object of the present invention is to provide a relay housing of new conception which can be used to advantage instead of known housings and can be constructed in such manner as to satisfy supersonic speed flying conditions.

The inventon is a result of a more thorough analysis of the problem than has been made heretofore. Two technical requirements have to be satisfied; on the one hand, the accessories and their driving elements must be supported by means resisting the prevailing stresses or forces and, on the other hand, there must be obtained a closed chamber which encloses the transmission means and forms, if required, an oil collector or reservoir. These two requirements have heretofore been satisfied by a single unit, the known housings performing these two functions. The present inventon consists in replacing said single unit or housing by an assembly of two means or units so designed that one of the means alone satisfies one of said technical requirements and the other means alone the other of said requirements in the best manner. To this end, the invention provides a housing for a relay for driving accessories which are detachably mounted on and outside said housing, the latter being characterized in that it comprises, for carrying the accessories and the transmission means for driving the accessories, a rigid and strong framework outside of which the major part of the transmission means are located, said framework being adapted to resist in itself the stresses, the space occupied by the transmission means being, if desired, closed by light closing means, such as a cover or coverplates, fixed to said framework, if desired in a fluidtight manner thereby constituting a fluidtight compartment.

This arrangement presents various advantages over known relays, and notably accessibility of the various components. It presents, moreover, this advantage that without undue increase in weight, the framework could be made of a material other than light alloy and advantageously of a metal having substantially the same coefficient of expansion as that of the anti-friction bearing used, for example steel. In using this metal, the framework does not lose its strengh at the temperatures to which it is exposed at supersonic speeds. In a particular embodiment, the framework is composed of pressed and welded sheet metal elements. In the case of relays intended for supersonic aircraft, it is advantageous to construct the framework of titanium.

In the interests of simplicity, when it is desired to enclose the driving means in a fluidtight compartment, the framework forms in itself a continuous fluidtight wall which forms, with a light cover attached to this wall, a fluidtight chamber which may be used as an oil reservoir. In a particular embodiment of such a framework, the accessories to be driven are mounted on the framework on the same side of the latter and the driving means for these accessories extend through the framework, the part of these driving means disposed outside the framework being located on the side of the latter opposed to the side on which the accessories are mounted. In such a construction, it is advantageous that the framework be composed of a plurality of cups or sleeves rendered rigid with respect to one another by thin spacing members, the accessories to be driven being mounted on the ends of these sleeves situated on the same side of the spacing members, one accessory being mounted on one sleeve and bearings being provided at the opposite ends of the sleeves for supporting a gear disposed at the end of each of the sleeves, which gear forms part of the transmission means which transmit movement to the corresponding accessory and extend inside said sleeve between said gear and the accessory. These bearings are advantageously formed by the framework itself, but they could also be fixed to the latter.

Preferably, the end of each sleeve on which is mounted an accessory supports an attached bearing which is, if desired, of fluidtight seal type and extends inside the sleeve and supports the last transmission element of said transmission means, that is, the element which is coupled to the accessory to be driven. There is preferably associated with each gear bearing at the end of the framework sleeve, or main bearing, an auxiliary bearing which helps to support said gear and is advantageously of the same material as the framework, detachably fixed to the latter and disposed on the side of the gear opposed to that on which the main bearing is disposed.

Such an auxiliary bearing is preferably apertured so as to reveal the teeth of the gear supported thereby and the meshing of these teeth with the driving gear.

The various auxiliary bearings are advantageously rigid with one another so as to form an assemblage which is fixed as a unit to the framework; they are for example cast in one block, pressed in a single plate, or fixed to a common support.

The main shaft, which transmits the movement to the various accessories, is also supported, on the side of the framework, by a main bearing formed by, or fixed to, the framework and by an auxiliary bearing which is similar to said auxiliary bearings at the end of the sleeves but is preferably of the fluidtight seal type and detachably fixed to the framework and, when the auxiliary bearings are rigid with one another in the form of a unit, also forms part of said unit.

It is moreover advantageous that the points of the framework at which the relay is fixed in position on the device it is adapted to serve, be as near as possible to the face of the framework on which the accessories are fixed, for example at the ends of the sleeves on which the accessories are mounted in the case of a framework comprising sleeves.

In the case of a framework obtained by the assemblage of sheet metal elements, the latter comprise sleeves or cups each of which is pressed separately and a plate provided with apertures each of which latter are surrounded by a flanged or raised edge, the sleeves being fitted in these apertures of the plate. Preferably, each of the sleeves presents, at the end opposed to that receiving the accessory to be driven, a transverse wall provided at its centre with an aperture and exteriorly with a cylindrical flange or spigot coaxial with the sleeve and engaged in an aperture formed in a counterplate.

Further features and advantages of the invention will be apparent from the ensuing description of one embodiment of a mechanical relay, with reference to the accompanying drawing, to which the invention is in no way restricted.

In the drawing:

FIG. 1 is a longitudinal sectional view of the relay;

FIG. 2 is a side view, the protecting cover having been removed, and

FIG. 3 is a longitudinal sectional view of a modification of solely the framework.

In the embodiment shown in FIGS. 1 and 2, the relay comprises a strong rigid framework generally designated by the reference numeral 1 and comprising two sleeves or cups 2 and 3 interconnected by spacing means formed by a thin transverse plate 4 which is fluidtight and extends between the sleeves and around the latter in the region of one of their ends. This end of each sleeve 2, 3 is completely open and provided with an outer flange 5, 6. Mounted on this flange is a bearing 7, 8 which has a sealing member 9, 10; said bearing extends inside the corresponding sleeve and includes a flange which is applied against the flange of this sleeve. It is to this end of the sleeves which the accessories A, B to be driven are fixed, the flanges of the latter being applied against the flanges of the bearings 7, 8, the three flanges being clamped together by collars 11, 12.

Each cup or sleeve 2, 3 comprises at its other end a transverse wall in the centre of which is provided an aperture. This apertured wall is arranged to constitute a housing or seat for an anti-friction bearing and thus performs the function of a bearing 13, 14.

The framework is also provided in its central part with a main bearing 15 formed in an apertured stiffening web 16 interconnecting the sleeves 2, 3 in the vicinity of their ends remote from the plate 4. Disposed in coaxial relation to the bearings 13, 14, 15 are auxiliary bearings respectively designated by the reference numerals 17, 18 and 19, the bearing 19 including a sealing member 20. These bearings are grouped together in a single-piece unit 20a detachably fixed to the framework 1 by screws 21.

The first pair of the pairs of bearings 13—17, 14—18, supports a gear 22 and the second pair supports a gear 23. Each gear is interposed between the two bearings of the pair supporting and meshes with a central gear 24 carried by the pair of bearings 15—19 to which the movement to be transmitted to the accessories is imparted by an exterior shaft 25 through the medium of a swivel coupling 26. The single-piece unit 20a comprising the bearings 17, 18 and 19 is apertured as shown in FIG. 2, so that it is possible to perceive therethrough the meshing of the gears 22 and 23 with the gear 24 and the rolling parts (balls, rollers or needles) of the corresponding bearings.

The gears 22 and 23 are each rigid with a shaft 27, 28 which extends inside the sleeve 2, 3 and drives and supports one side of a torque limiter 29, 30 the other side of which is supported by the bearing 7, 8 fixed to the other end of the sleeve. The torque limiter is coupled to the end of the shaft of the accessory fixed to this end of the sleeve. The opening of this sleeve end is large enough to permit introduction of the torque limiter. Capping the single-piece unit 20a comprising the bearings 17, 18, 19 is a light cover 31 detachably fixed by screws at its periphery to the framework 1 and in its central part to the central bearing 19 with, if desired, interposition of sealing members. The space defined by the cover 31, the framework 1 and the bearings 17, 18 and 19 is therefore a closed chamber and is fluidtight if said sealing members and those of the bearings 7, 8 and 19 are provided. This chamber could therefore be used as an oil reservoir.

For holding in position the relay thus constructed, the framework is provided with fixing means formed by bosses or lugs 32 which are as near as possible to the points at which the accessories A and B are mounted, that is, in the presently-described embodiment, the ends of the sleeves 2, 3.

The framework 1, the single-piece unit 20a comprising the bearings 17, 18 and 19 and the bearings are advantageously constructed in such manner as to have substantially the same coefficient of expansion as the antifriction bearings. The material selected for the framework is preferably a metal having great strength, even at high temperature, such as steel, malleable iron, titanium, but it could also be constructed of light alloy without departing from the scope of the invention.

If the quantity of relays to construct so justifies, the framework could be constructed of pressed sheet steel elements welded together as shown in FIG. 3.

In this embodiment the framework comprises a support plate 41 which is provided with fixing means or bosses 42 for fixing the relay in position and in which are pressed sleeves or flanges 43 and 44. Forced in the latter and welded in position are cups or sleeves 2a, 3a which are also pressed metal elements. The transverse end walls of these elements constitute bearings 13a, 14a and are fitted in apertures formed in a counterplate 45 which is fixed to these elements by welding or brazing. Fitted in another aperture in this counterplate and welded in position is a bearing 15a for the central driving gear (gear 24 in FIG. 1).

Whatever its construction, it can be seen that the framework supports the bearings and all the moving mechanical parts: gears, rotating joints of the driving shafts of the relay and of the shafts driving the accessories, and it is possible to observe this mechanical assembly in operation after the detachable cover 31 covering this assembly has been removed. The fluidtight connection between this cover 31 and the framework is ensured by static sealing members which do not require a precise centering.

Although specific embodiments of the new housing of the mechanical relay have been described, many modifications and changes may be made therein without departing from the scope of the invention as defined in the appended claims. Thus, there may be any number of sleeves in the framework, the axes of these sleeves could have any relative orientation instead of being parallel with one another, and the lateral walls of these sleeves could be apertured.

What I claim is:

1. Housing for mechanical relay having transmission means for driving accessories, said housing comprising: a rigid and strong framework which is adapted to withstand the stresses and includes a plurality of sleeves parallel to each other and each having an open end adapted to receive one of said accessories, all open ends of the sleeve being located on one and same side of the framework, and light spacing and fluid tight means connected to said sleeves; a bearing carried by each end of each sleeve and intended to support a part of said transmission means in said sleeve; and a light cover fixed to said framework so as to constitute with the latter a closed chamber capable of being used as an oil reservoir, the framework being further adapted so that the part of the transmission means located outside the sleeves is located on the side of the framework opposed to the sleeve open ends on which are to be mounted the accessories.

2. Housing as claimed in claim 1, wherein the bearing disposed on the end of each sleeve on which an accessory is to be mounted is a detachable bearing, said housing further comprising collars for clamping together said sleeve end, the detachable bearing and the accessory.

3. Housing as claimed in claim 1, wherein the spacing means comprise fixing means forming one piece with said spacing means and located on to the side of the framework on which the accessories are mounted.

4. Housing as claimed in claim 1, further comprising, for each sleeve, an auxiliary bearing which is in alignment with the two bearings of said sleeve and is detachably fixed to the framework so as to help to support the transmission means in association with said two bearings.

5. Housing as claimed in claim 4, wherein all the auxiliary bearings are apertured and rigid with one another so as to form a detachable unit capable of being fixed as a unit to the framework.

6. Housing as claimed in claim 1, further comprising a main bearing carried by the framework for supporting a driving shaft and an auxiliary bearing detachably fixed to the framework for supporting, in association with the main bearing, said driving shaft.

7. Housing as claimed in claim 1, wherein each sleeve has at its end opposed to that adapted to receive an accessory a transverse wall provided with a central aperture and provided exteriorly with a cylindrical flange coaxial with the sleeve, said housing further comprising a counterplate provided with apertures in each of which is engaged one of said cylindrical flanges.

References Cited in the file of this patent

UNITED STATES PATENTS

| | | | |
|---|---|---|---|
| 908,662 | Guy | Jan. 5, | 1909 |
| 1,171,477 | Thormahlen | Feb. 15, | 1916 |
| 1,456,082 | Warren | May 22, | 1923 |
| 1,862,512 | Short | June 7, | 1932 |
| 1,902,934 | Acker | Mar. 28, | 1933 |
| 2,237,958 | Hansen et al. | Apr. 8, | 1941 |
| 2,244,603 | Bauer | June 3, | 1941 |
| 2,269,916 | Price | Jan. 13, | 1942 |
| 2,287,302 | Gifford et al. | June 23, | 1942 |
| 2,327,962 | Drake | Aug. 24, | 1943 |
| 2,583,751 | Schmitter | Jan. 29, | 1952 |
| 2,762,232 | Bade | Sept. 11, | 1956 |
| 2,783,654 | Carnell | Mar. 5, | 1957 |
| 2,888,831 | Malcom | June 2, | 1959 |

OTHER REFERENCES

Metals Handbook (A.S.M.), 8th edition, 1961, page 54. (Copy in Division 3.)